United States Patent
Wang et al.

(10) Patent No.: US 10,193,327 B2
(45) Date of Patent: Jan. 29, 2019

(54) SAFETY CONTROL METHOD AND DEVICE FOR SYSTEM WITH PRECHARGING CIRCUIT, AND SYSTEM THEREOF

(71) Applicant: SCHNEIDER TOSHIBA INVERTER EUROPE SAS, Pacy-sur-Eure (FR)

(72) Inventors: Yingqiang Wang, Shanghai (CN); Dawei Liu, Shanghai (CN); Zhe Li, Shanghai (CN)

(73) Assignee: SCHNEIDER TOSHIBA INVERTER EUROPE SAS, Pacy-Sur-Eure (FR)

( * ) Notice: Subject to any disclaimer, the term of this patent is extended or adjusted under 35 U.S.C. 154(b) by 612 days.

(21) Appl. No.: 14/429,638

(22) PCT Filed: Sep. 16, 2013

(86) PCT No.: PCT/CN2013/083525
§ 371 (c)(1),
(2) Date: Mar. 19, 2015

(87) PCT Pub. No.: WO2014/044155
PCT Pub. Date: Mar. 27, 2014

(65) Prior Publication Data
US 2015/0236499 A1    Aug. 20, 2015

(30) Foreign Application Priority Data
Sep. 20, 2012 (CN) .......................... 2012 1 0352313

(51) Int. Cl.
H02H 3/247 (2006.01)
(52) U.S. Cl.
CPC .................................. H02H 3/247 (2013.01)
(58) Field of Classification Search
CPC ................................................... H02H 3/247
(Continued)

(56) References Cited

U.S. PATENT DOCUMENTS

| | | | | |
|---|---|---|---|---|
| 3,590,325 | A * | 6/1971 | McMillen | ................ H02H 1/06 340/663 |
| 2004/0047097 | A1* | 3/2004 | Jordan | ............... G01R 31/3278 361/92 |
| 2012/0140370 | A1 | 6/2012 | Chen et al. | |

FOREIGN PATENT DOCUMENTS

| | | |
|---|---|---|
| CN | 101316050 A | 12/2008 |
| CN | 101420113 A | 4/2009 |

(Continued)

OTHER PUBLICATIONS

Second Office Action issued by Chinese Patent Office from corresponding Chinese Application No. 201210352313.4 dated Feb. 5, 2015 [Full English Translation attached].

(Continued)

*Primary Examiner* — Kevin J Comber
(74) *Attorney, Agent, or Firm* — Lando & Anastasi, LLP

(57) ABSTRACT

The object of the present application is to ensure the security of a device when a precharging relay is not closed and a load current passes through a precharging resistor, so as to ensure the customer's security. Provided is a security control method for a system with a precharging circuit, comprising: giving out an error alarm and stopping operating the system when the number of times of undervoltage of a precharging circuit achieves m times and the duration between the first undervoltage and the mth undervoltage is less than or equal to τ seconds, where m and τ are positive integers. Compared with the previous method, the present invention has the following advantages of no danger of combustion and high reliability; and cost saving and no need of adding additional hardware.

15 Claims, 3 Drawing Sheets

(58) Field of Classification Search
USPC .......................................................... 361/92
See application file for complete search history.

(56) References Cited

FOREIGN PATENT DOCUMENTS

| CN | 102186284 A | 9/2011 |
|----|-------------|--------|
| JP | H08168250 A | 6/1996 |
| JP | 2005295697 A | 10/2005 |
| JP | 2009089535 A | 4/2009 |
| WO | 00/62393 A1 | 10/2000 |

OTHER PUBLICATIONS

Third Chinese Office Action from corresponding Chinese Application No. 201210352313.4 dated Aug. 2, 2016 [English Translation attached].
Chinese First Office Action from corresponding Chinese Application No. 201210352313.4 dated Jul. 1, 2015.
Extended European Search Report from corresponding European Application No. 13838926.7 dated Sep. 8, 2015.
International Preliminary Report on Patentability for corresponding PCT Application No. PCT/CN2013/083525 dated Mar. 24, 2015.
International Search Report and Written Opinion from corresponding PCT/CN2013/083525 dated Dec. 19, 2013.
Japanese Office Action from corresponding Japanese Application No. 2015-531453 dated Mar. 15, 2016.
European Office Action issued by the European Patent Office from corresponding European Application No. 13838926.7 dated Aug. 8, 2017.

\* cited by examiner

SAFETY CONTROL METHOD AND DEVICE FOR SYSTEM WITH PRECHARGING CIRCUIT, AND SYSTEM THEREOF

CROSS-REFERENCES TO RELATED APPLICATIONS

This application is the U.S. National Phase Application under 35 U.S.C. § 371 of International Application No. PCT/CN2013/083525, filed Sep. 16, 2013, which claims priority to Chinese Patent Application No. CN201210352313.4, filed Sep. 20, 2012. These prior applications are incorporated by reference herein in their entirety.

TECHNICAL FIELD

The present invention relates to a security control method and apparatus and a system comprising the apparatus, and more particularly to a security control method and apparatus of a frequency converter or another control system with a precharging circuit, and a system comprising the apparatus.

BACKGROUND

In a system of a precharging circuit having a large capacitor (such as a bus capacitor), when a precharging relay is at fault to be unable to be closed, there will emerge a problem that a precharging resistor become overheated.

For example, FIG. 1 shows a frequency converter having a precharging circuit.

As shown in FIG. 1, when precharging relay S1 can not be closed, during the period of charging and discharging of capacitor C1, due to voltage dividing of resistor R1, resistor R1 will become overheated, and capacitor C1 will have undervoltage due voltage dividing of resistor R1.

A product usually needs to be subject to UL (Underwrites Laboratories Inc) tests in order to meet security testing requirements. For the system of a precharging circuit of a large capacitance involved in the present application, the UL testing requirements are as follows:

1) the precharging relay is never closed (i.e., manually opening the precharging relay, and simulating a fault situation) and the motor is under a full load. All load currents will pass the precharging resistor.

2) when the precharging resistor becomes overheated, it is checked the cotton-like object around the frequency converter will not be burned so as to ensure the security of the customer.

When the motor runs under a rated load and at a rated speed, the precharging relay is opened again. A monitor for monitoring the voltage of a main circuit indicates "NOFF" (i.e., undervoltage in the main circuit). Next, the frequency converter runs again and "NOFF" occurs again.

After about 15 minutes, due to overheating of the precharging resistor, the precharging resistor always ignites the cotton-like object, but the precharging resistor is not fused.

FIG. 2 shows a device which is burned and damaged due to overheating of a precharging resistor. As shown in FIG. 2, the whole device is damaged since the precharging resistor ignites the cotton-like object.

When conducting this kind of test, before the burning appears, the precharging resistor will be damaged (broken circuit), and there is no other protection method.

This kind of method has the following dangers:
There also exists the risk of ignition, and the resistor is damaged so that it is not very reliable; and When this case appears, the frequency converter will be damaged permanently.

SUMMARY

Additional features and advantages of the present application will be set forth in the description which follows, and in part will be apparent from the description, or may be learned by practice of the invention.

An object of the present application is to find a new security control method to ensure a customer's safety. By using the method of the present application, a precharging relay having a never closing status can be tested securely. The method according to the present application will neither damage a resistor, nor result in cotton burning.

The object of the present application is to ensure:
avoiding the risk of ignition;
protecting a frequency converter from being damaged permanently; and
saving cost.

The present application intends to:
avoid dangerous situations; and
pass UL tests.

The present application provides a security control method for a system with a precharging circuit, comprising: issuing an error alarm and stopping operating the system when the number of times of undervoltage occurred in a precharging circuit reaches m times and the duration between the first undervoltage and the mth undervoltage is less than or equal to $\tau$ seconds, where m and $\tau$ are positive integers.

The present application also provides a security control apparatus for a system with a precharging circuit, comprising: a first determining device is configured to determine whether the number of times of undervoltage occurred in a precharging circuit reaches m times; a second determining device is configured to determine whether the duration between the first undervoltage and the mth undervoltage is less than or equal to $\tau$ seconds; an alarming device is configured to issue an error alarm and stopping operating the system when the first determining device determines that the number of times of undervoltage occurred in the precharging circuit reaches m times and the second determining device determines the duration between the first undervoltage and the mth undervoltage is less than or equal to $\tau$ seconds, where m and $\tau$ are positive integers.

The present application further provides a system with a precharging circuit containing the above mentioned security control apparatus.

Compared with the previous method, the present application has the following advantages:
no danger of combustion and high reliability; and
cost saving and no need for adding additional hardware.

BRIEF DESCRIPTION OF THE DRAWINGS

The above and other objects, characteristics and advantages of the present invention will become more apparent from the detailed description of the preferred embodiments of the present invention taken in conjunction with drawings, in which identical reference numbers refer to units having identical structures and in which.

DETAILED DESCRIPTION

The embodiments of the present invention will be explained hereinafter. The present invention may, however, be embodied in many different forms and should not be construed as being limited to the embodiments set forth herein. Rather, these embodiments are provided so that this disclosure will be thorough and complete and will fully express the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present application provides a security control method and apparatus of a simple precharging circuit, and a system comprising the apparatus.

Figure 1:
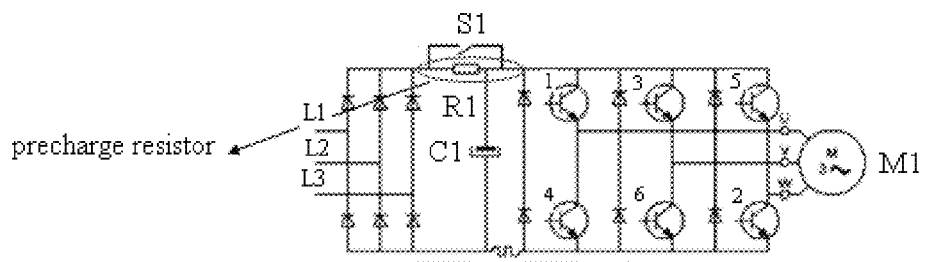
FIG. 1 shows a frequency converter having a precharging circuit.
Figure 2:
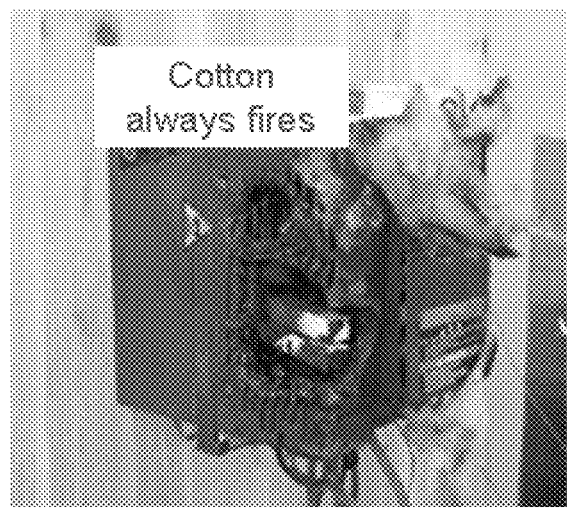
FIG. 2 shows a device which is burned and damaged due to overheating of a precharging resistor.
Figure 3:
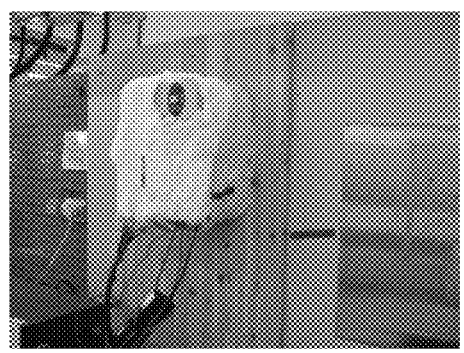
FIG. 3 shows installation of a frequency converter having a precharging circuit when conducting a UL test.

FIG. 3 shows installation of a frequency converter having a precharging circuit when conducting a UL test. First as shown in FIG. 3, a frequency converter for testing is installed according to the requirement of the UL test, i.e., the frequency converter is wrapped by using a cotton-like object, to test whether the security can be ensured when the precharging relay is at fault.

Then, the situation that the precharging circuit is at fault when the frequency converter is running is created by using the following steps, so as to test the security control method according to the present application.

1) setting an operation command to the frequency converter;

2) adding a full load and running the frequency converter; and 3) always manually opening a precharging relay.

A test cycle will begin:

Run→"NOFF"→run→"NOFF" . . .

Figure 4:
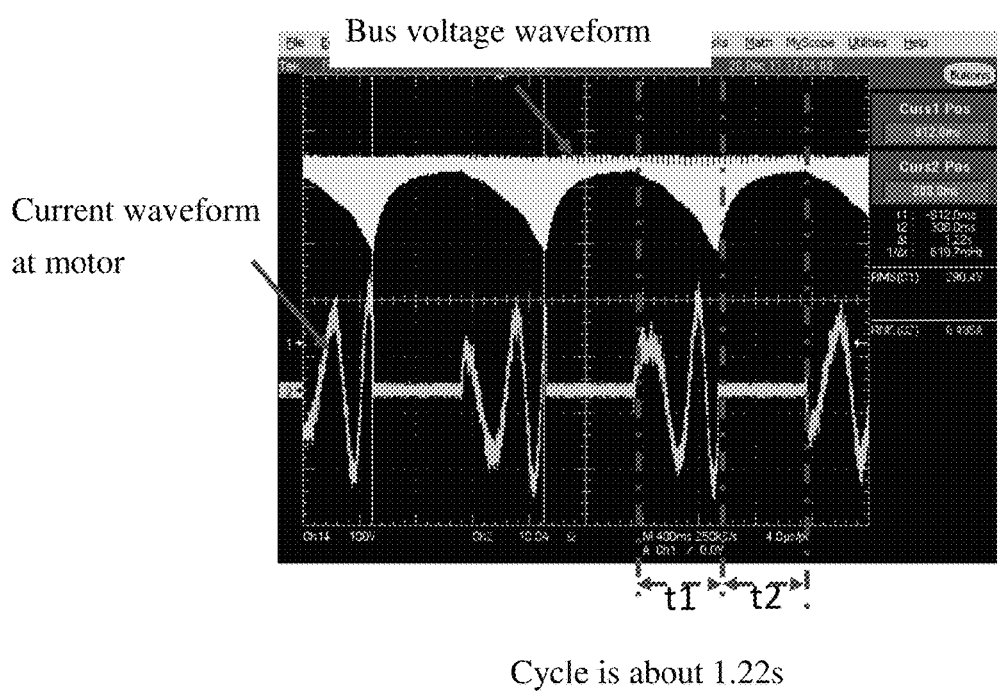
FIG. 4 shows a waveform in a frequency converter having a precharging circuit when the precharging circuit is at fault.

FIG. 4 shows a waveform in a frequency converter having a precharging circuit when the precharging circuit is at fault.

When precharging relay S1 can not be closed, in a period t1+t2 of charging and discharging of capacitor C1, due to voltage dividing of resistor R1, the resistor R1 will become overheated, and the capacitor C1 undervoltage condition occurs due to voltage dividing of resistor R1.

As shown in FIG. 4, during the operation of the frequency converter, when a precharging relay S1 is at fault to be unable to be closed, during t1, a motor M1 runs, while a bus voltage (the voltage between the two ends of C1) decreases sharply. Since the bus voltage decreases to the minimum at the end of t1, the motor can not be driven to run, and thus, at the end of t1, the motor stops. At this time, the frequency converter indicates the precharging circuit is of undervoltage. During t2, by charging the bus capacitor C1 through the precharging resistor R1, the bus voltage rises to drive the motor to run. As shown in FIG. 4, by taking t1+t2 as an period, a charging and discharging process is repeated, where t1+t2 is approximately equal to 1.22 s, for example.

It can be known from the waveform of FIG. 4 that, when the precharging relay can not be closed, the status of undervoltage of the bus voltage will be repeated in a period of approximately 1.22 s. That is, in a very short time, many times of undervoltage status will be detected. According to the above mentioned characteristics, the security control method according to the present application continuously checks the voltage in the circuit, and when the number of times of undervoltage occurred in the precharging circuit reaches a predetermined times and the duration between the first undervoltage and the predetermined time of undervoltage is less than or equal to a predetermined time, it can be determined that the precharging relay can not be closed, and thus an alarm is given out and the system is stopped.

Figure 5:
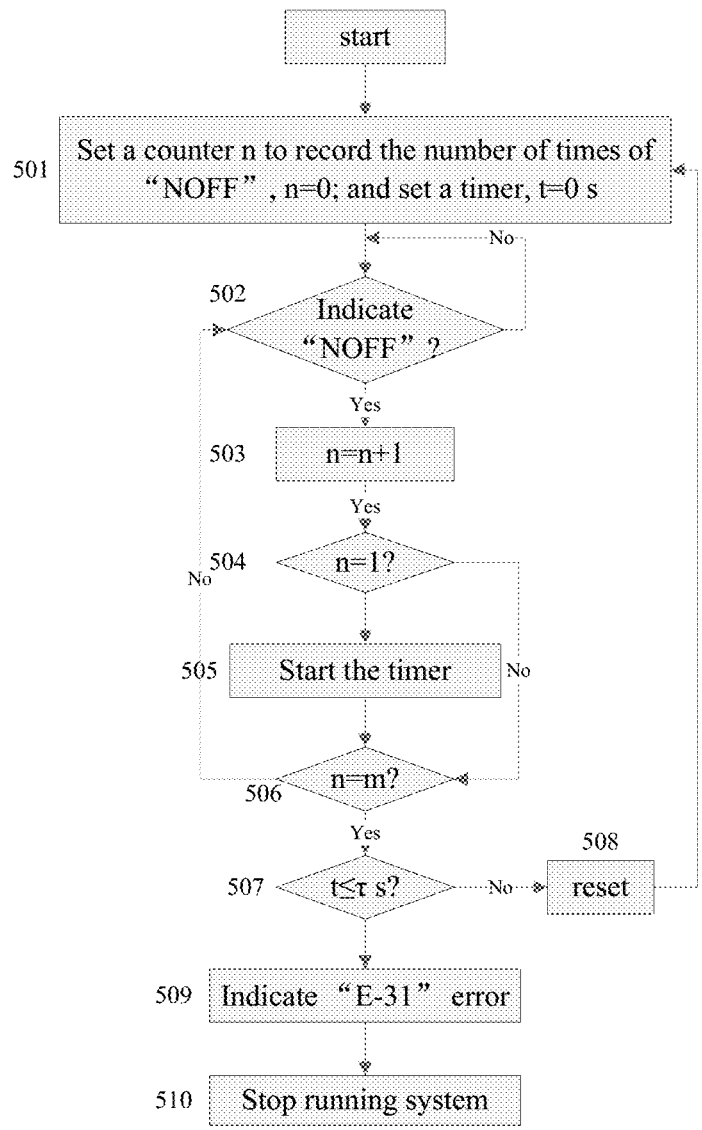
FIG. 5 shows a flow chart of the steps of a security control method according to an embodiment of the present invention.

FIG. 5 shows a flow chart of the steps of a security control method according to an embodiment of the present invention.

As shown in FIG. 5, at step 501, a counter is initialized, n=0, and the number of times of "NOFF" (i.e., the number of times of undervoltage occurred in the precharging circuit) is recorded by using the counter; and a timer t is initialized, t=0 s, where t is used for recording the period from the occurring of "NOFF" for the first time.

At step 502, it is determined that whether the monitor indicates "NOFF".

If so, then the process proceeds to step 503. At step 503, n=n+1. If it is determined that no "NOFF" is indicated, then the process returns to step 502 to continue the determination.

At step 504, it is determined that whether n=1. If n=1, then the process proceeds to step 505. If n is not equal to 1, then the process advances to step 506.

At step 505, the timer t is started, and the period from the beginning of occurring of "NOFF" starts to be recorded. Next, the process proceeds to step 506.

At step 506, it is determined that whether n is equal to m? m is an integer. For example, m=40. But those skilled in the art should understand that m can also be assigned any suitable value according to practical situations.

If n is not equal to m, then the process returns to step 502. If n=m, then the process proceeds to step 507.

At step 507, it is determined that whether t is less than or equal to τ s? If τ is less than or equal to τ s, then the process proceeds to step 509; otherwise the process proceeds to step 508. τ is an integer. For example, τ=225.

At step 508, the counter n and the timer t are reset, that is, n=0 and t=0, and the process returns to step 501. That is, if the period during which undervoltage occurs 40 times is larger than 225 s (about 3 minutes more), then it may be other faults in the frequency converter instead a fault of the precharging relay. For example, when turning on and off the power source for the frequency converter each time, the voltage is detected, and there will occur the case of NOFF. So the other faults may be unmanual or manual power off cases. Therefore, the frequency converter or the system is reset to restore the frequency converter or the system.

At step 509, "E-31" error is indicated (the precharging relay has an error). That is, if the period during which undervoltage occurs 40 times is within 225s (about 3 minutes more), then it is determined that it may be a fault of the precharging relay, and the monitor indicates the error. Next, the process proceeds to step 510.

At step 510, the "run" command is stopped.

According to the security control method of the present application, when the number of times of undervoltage occurred in the precharging circuit reaches m times and the duration between the first undervoltage and the mth undervoltage is less than or equal to τ seconds, it indicates that the precharging relay can not be closed. At this time, an error alarm will be issued and the system stops running.

And when the number of times of undervoltage occurred in the precharging circuit reaches m times and the duration between the first undervoltage and the mth undervoltage is greater than τ seconds, it indicates that it is not a fault that the precharging relay can not be closed. At this time, the system is reset so that the system can run again.

Therefore, according to the security control method of the present application, it can be found in time that the precharging relay in the precharging circuit is at fault, and the system is stopped in time, so as to avoid such problems as ignition and system damage due to overheating of a resistor. And the security of a customer using the system can be ensured.

Although, in the above, m and τ are assigned value 40 and 255, respectively, those skilled in the art should understand that, m and τ are determined based on the charging and discharging periods at the time of testing and the burning time of cotton when the measure is not adopted. So, the values of m and τ are different for different cases and depend on experimental data. For example, usually according to experiments cotton begins to burn after 15 minutes (900 seconds) passed. Therefore, as long as the period during which undervoltage occurs is far less than 900 seconds, the system security can be ensured. Likewise, it can be known according to FIG. 4 that the charging and discharging period is about 1.22 seconds, so in the method of the present application, it is effective as long as n and τ are properly assigned values so as to meet 1.22 seconds×n<τ seconds<<900 seconds.

It should be understood that each block in the flow chart and the combinations of the blocks of the flow chart can be implemented through computer program instructions. These computer program instructions can also be stored in a computer readable storage, can direct a computer or another programmable data processing device to run in a certain way, and allows the instructions stored in the computer readable storage to generate a manufacture that implement instruction means of functions/acts specified in the blocks of the flow chart.

The computer program instructions can also be loaded onto the computer or the other programmable data processing device, which results in that a series of operation steps are executed on the computer or the other programmable data processing device to generate a process implemented by the computer, allowing the instructions executed on the computer or the other programmable data processing device to provide steps for implementing specified functions/acts in the blocks of the flow chart. Each block can denote a code module, a fragment or a portion, which comprises one or more executable instructions used to implement specified logic functions. It should also be noted that, in other implementations, the functions marked in the blocks may not occur according to the sequence marked in the figure. For example, according to the involved functions, two blocks shown continuously may occur substantially concurrently, or the blocks may be executed in a reverse order sometimes.

Although the flow chart in FIG. 5 describes the security control method according to the embodiment of the present invention by using certain steps as an example, but the specific implementation steps of the security control method according to the embodiment of the present invention is not limited to the flow chart of FIG. 5. Other flow charts that can implement identical functions are also within the protection scope of the present invention.

For the system with the precharging circuit, first, according to UL requirements, the security control method according to the embodiment of the present invention is used to update the software of the system and set an frequency converter or another control system.

Secondly, a UL test begins, and indicates "E-31". The test passes, which indicates that the security control method can ensure the security of the system.

Although the present application is described by using a frequency converter with a precharging circuit as an example, those skilled in the art should understand that the present invention can be applied to a frequency converter having a precharging circuit or another control system such as a circuit having a large-capacity DC bus capacitor or a super capacitor like UPS, and inverter, etc.

The foregoing is illustrative of the present invention and is not to be construed as limiting thereof. Although several embodiments of the present invention have been described, those skilled in the art will readily appreciate that many modifications can be made to the exemplary embodiments without departing from the novel teachings and advantages of the present invention. Accordingly, all such modifications are intended to be included within the scope defined by the claims. It is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the claims and their equivalents.

The invention claimed is:

1. A safety control method for a system including a precharging circuit, the control method comprising:
   detecting if a number of times that the precharging circuit has reached an undervoltage condition reaches a threshold number of times;
   calculating a duration between the precharging circuit reaching the undervoltage condition for a first time and the precharging circuit reaching the undervoltage condition for the threshold number of times;
   issuing an error alarm and stopping operation of the system when the number of times reaches the threshold number of times and the duration is less than or equal to a threshold period of time.

2. The safety control method according to claim 1, further comprising:
   setting a counter for counting the number of times the undervoltage condition occurred in the precharging circuit in the system; and
   setting a timer for recording the duration starting from the first undervoltage condition occurrence.

3. The safety control method according to claim 2, further comprising:
   continuously detecting whether the undervoltage condition occurs in the precharging circuit;
   counting, using the counter, the number of times the undervoltage condition occurs; and
   clocking, using the timer, from the first undervoltage condition.

4. The safety control method according to claim 3, further comprising:
   resetting the counter and the timer in response to detecting the number of times that the precharging circuit has reached the undervoltage condition reaches the threshold number of times and the duration is greater than the threshold period of time.

5. The safety control method according to claim 4, wherein the threshold number of times is 40 and the threshold period of time is 225 seconds.

6. A safety control apparatus for a system with a precharging circuit, comprising:
    a first device configured to detect if a number of times that the precharging circuit has reached an undervoltage condition reaches a threshold number of times;
    a second device configured to calculate a duration between the precharging circuit reaching the undervoltage condition for a first time and the precharging circuit reaching the undervoltage condition for the threshold number of times; and
    an alarm device configured to issue an error alarm and stop operation of the system when the number of times reaches the threshold number of times and the duration is less than or equal to a threshold period of time.

7. The safety control apparatus according to claim 6, further comprising:
    a counter configured to count the number of times the undervoltage condition occurred in the precharging circuit in the system; and
    a timer configured to record the duration starting at the first time.

8. The safety control apparatus according to claim 7, further comprising:
    a continuity component configured to:
    continuously determine whether the undervoltage condition occurs in the precharging circuit;
    count, using the counter, the number of times the undervoltage condition occurs; and
    measure the duration from the first time using the timer.

9. The safety control apparatus according to claim 8, further comprising:
    a resetting device configured to reset the counter and the timer in response to detecting the number of times that the precharging circuit reaching the undervoltage condition reaches the threshold number of times and the duration is greater than the threshold period of time.

10. The safety control apparatus according to claim 9, wherein the threshold number is 40 and the threshold period of time is 225 seconds.

11. A system comprising:
    a precharging circuit; and
    a safety control apparatus coupled to the precharging circuit, the safety apparatus including:
    a first device configured to detect if a number of times that the precharging circuit has reached an undervoltage condition reaches a threshold number of times;
    a second device configured to calculate a duration between the precharging circuit reaching the undervoltage condition for a first time and the precharging circuit reaching the undervoltage condition the threshold number of times; and
    an alarm device configured to issue an error alarm and stop operation of the system when the number of times reaches the threshold number of times and the duration is less than or equal to the threshold number of times.

12. The system according to claim 11, wherein the safety control apparatus further comprises:
    a counter configured to count the number of times the undervoltage condition occurrs in the precharging circuit in the system; and
    a timer configured to record the duration starting at the first time.

13. The system according to claim 12, wherein the safety control apparatus further comprises:
    a continuity component configured to:
    continuously determine whether the undervoltage condition occurs in the precharging circuit;
    count, by using the counter, the number of times the undervoltage condition occurs; and
    clock, by using the timer, from the first time.

14. The system according to claim 13, wherein the safety control apparatus further comprises:
    a resetting device configured to reset the counter and the timer in response to detecting the number of times that the precharging circuit reaching the undervoltage condition reaches the threshold number of times and the duration is greater than the threshold period of time.

15. The system according to claim 14, wherein the threshold number is 40 and the threshold period of time is 225 seconds.

* * * * *